Aug. 4, 1964   D. F. HANNON   3,143,454
LAMINATING PRESS
Filed Jan. 11, 1960   3 Sheets-Sheet 1

INVENTOR.
DONALD F. HANNON
BY
ATTORNEYS

Aug. 4, 1964   D. F. HANNON   3,143,454
LAMINATING PRESS
Filed Jan. 11, 1960   3 Sheets-Sheet 2
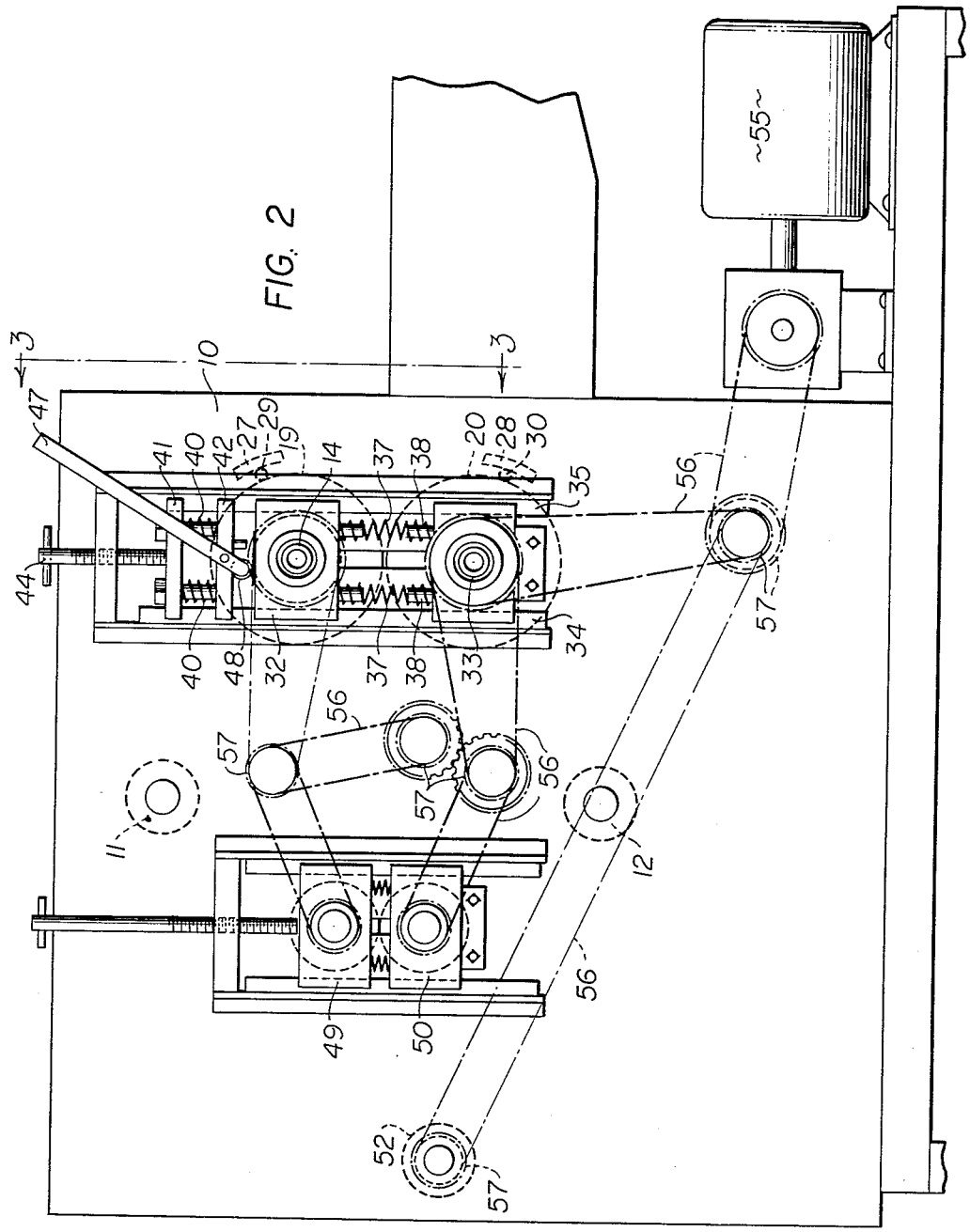
INVENTOR.
DONALD F. HANNON
BY Watts, Edgerton,
Pyle & Fisher
ATTORNEYS INVENTOR.
DONALD F. HANNON
BY Watts, Edgerton
Pyle & Fisher
ATTORNEYS

United States Patent Office 3,143,454
Patented Aug. 4, 1964

3,143,454
LAMINATING PRESS
Donald F. Hannon, Shaker Heights, Ohio, assignor to Laminators, Inc., a corporation of Ohio
Filed Jan. 11, 1960, Ser. No. 1,760
11 Claims. (Cl. 156—499)

This invention pertains to laminating and more particularly to a mechanism for applying a protective and decorative plastic sheet to a substrate.

There are many products now in commercial use which are paper and similar substrates with a protective plastic covering. One technique used to make such products is to utilize heat and pressure to apply a heat softenable clear plastic covering to the paper. Another and very satisfactory technique is to provide an outer protective layer which is bonded to the paper substrate by some suitable clear heat softenable adhesive. The usual method of application, with either of these techniques, has been to utilize a single station, flat, platen type press which compresses and heats the material for a preselected period of time.

Other proposals have utilized liquid heat dryable adhesives to bond webbed flexible continuous sheets of material together in a continuous operation. The machines used in these proposals are single purpose machines which neither have the versatility of this invention nor the ability to laminate relatively rigid materials.

Where an outer protective covering has been bonded to paper or similar substrates by a suitable heat softenable adhesive, some limitations have been present. Among these limitations is that usually a flat plate, platen press, or the like, has been required. The heat to soften the adhesive is passed through the outer protective covering. Thus, the outer covering had to have good heat resistance so that there was no noticeable or detectable degradation due to the heat applied to soften the adhesive.

In prior art mechanisms, laminations have generally been either very highly specialized and limited to one product or rather slow and costly because more or less individualized, one at a time processes have been employed, such as the mentioned flat type platen press. Further, flawless laminations have been difficult to obtain with prior mechanisms unless a substantial amount of care and skill were used.

The present invention overcomes these listed disadvantages of the prior proposals, and others. A high speed rotary press has been devised to permit a high speed continuous operation to be performed. With this rotary press several outstanding and even unexpected results have been obtained. These advantages will subsequently be described in detail. The advantages include highly superior laminations, as well as the production improvements in speed and efficiency, which will be somewhat more apparent.

With the rotary laminating press of this invention, a film in the form of a sheet of transparent material to form a protective covering with a suitable transparent adhesive bonded to the transparent material is fed through a heat station, preferably before being passed into one or more pressure applying stations. In the preferred heat station, for some protective coverings, the adhesive is exposed to the heating element so that the outer and protective film may be kept comparatively cool, and, in fact, in contact with a chilled roll if desired. Keeping the protective film comparatively cool is extremely advantageous. The arrangement permits highly successful laminations with heat susceptible, low cost materials even though the film is under tension as the process is performed.

For most applications the preferred film is one which has good tear and heat resistance. Of presently available materials, polyester film is preferred. Such a polyester film is a polyethylene glycol ester of terephthalic acid. Expressed another way, this polyester film is polymerized polyethylene glycol ester. Such a film is outstanding for protective lamination because of its transparency, its stability, abrasion resistance, tremendous tear resistance, high strength, good aging characteristics, substantial inertness, and high degree of imperviousness.

These polyester films are bonded to paper bases by suitable adhesive layers which should be thermoplastic, transparent, stable, capable of being heated without noticeable degradation, capable of forming a bond between the film and a suitable substrate. Polyethylene is an inexpensive chemical which has generally been used for this purpose because it meets all of the above outlined characteristics.

This machine accommodates the demands of a wide variety of films by permitting the heat softenable adhesive to be heated from the adhesive side, or through the protective film, or both. It also permits the protective film to be kept in contact with a chilled roll while the adhesive is heated, if that is desired.

With this invention the protective lamina, including the softened adhesive and a sheet of paper or other material to be laminated, are fed together through a plurality of, preferably two, pressure applying stations. In the first pressure applying station a pair of hard rolls are held in close but yieldable spaced relationship. A suitable spring arrangement is provided to supply the yieldable relationship. At the second work station a pair of relatively soft rubber rolls are positioned substantially in abutment with one another. The second station is sufficiently close to the first so that the adhesive is still in at least a partially softened condition when it arrives at the second pressure station. The soft rubber rolls draw the laminae from the first station and "knead" the laminae to work the adhesive into a close and flawless bond with the paper or similar substrate even with very high productions with low cost materials which could not be used for paper protecting laminae with prior mechanisms.

Accordingly, one of the principal objects of the invention is to provide a novel and improved laminating press for improved bonding of protective coatings to thin paperlike substrates.

A related principal object of the invention is to provide a novel and improved laminating press in which a plurality of pressure applying stations are provided to first bond the protective coating to a base sheet, and thereafter knead the coating into the sheet to form an inseparable bond.

A more specialized object is to provide a mechanism made in accordance with the previous objectives in which a pair of yieldably mounted hard rolls define a first work station and a pair of resilient rolls define a second work station.

An important object of the invention is to provide a novel and improved laminating press which protects the outer film from excessive heat during the laminating operation.

Expressed conversely, this important object of the invention is to provide a novel and improved laminating press in which inexpensive outer protective film materials which have poor heat characteristics can be used.

Another object of the invention is to provide a novel and improved laminating press in which a continuous laminating technique may be employed to provide long production runs of material which could previously be run only on platen type presses.

There are many laminating applications where it may be desirable to interpose some decorative or display object between the paper substrate and the outer protective coating. For example, a paint chip card or a card displaying samples of fingernail polish may have small samples of the product adhered to a paper base. The life of such a display sheet can be materially enhanced if a protective laminae is bonded to the paper substrate with the product samples interposed between them. Very attractive restaurant menus and other products can also be made with flakes of metal or other design producing materials interposed between the lamina and the paper. With prior known mechanisms, it was very difficult, if possible, to obtain a satisfactory bond between a paper substrate and a protective lamina, when some display or decorative object was interposed between them. This is true because it is necessary to provide a very uniform bond, which closely circumscribes the object interposed between the lamina and the substrate. Under such circumstances, it was not possible to obtain reasonable production runs with prior art mechanisms.

One of the extraordinary advantages of the present invention is that highly satisfactory bonds have been obtained with relatively bulky objects interposed between the paper and the lamina. These bonds have been obtained with highly satisfactory volume production. This has been accomplished by passing the material to be laminated through the described plurality of work stations to knead or work the adhesive into close circumscribing relationship about any object interposed between the paper base.

Accordingly, another of the more important objects of the invention is to provide a novel and improved laminating press in which objects may be interposed between a protective coating and a paper substrate.

When a protective lamina is applied to only one surface of a substrate of paper, the finished product has a tendency to curl. This problem is also overcome with the present invention. This is accomplished through the provision of a collection reel which winds the finished strip, lamina side out, to tension the lamina and thereby eliminate the curl. A heating unit may be interposed between the second pressure station and the collection reel to resoften the adhesive for this "uncurling."

Therefore, another of the objects of the invention is to provide a novel and improved mechanism made in accordance with the foregoing discussion, wherein the laminated strip is coiled to prevent curling of the strip.

To provide an adjustable machine which will accommodate a wide variety of paper thicknesses and objects interposed between the protective covering and the paper, a means is provided to adjust both the spacing of the hard rolls and the tensioning of the pressure springs which urge the rolls toward one another. The adjustment is accomplished by shifting a pressure spring along a guided path. An over-center lever mechanism is provided to selectively release or apply the pressure spring tension to one of the rolls. The selective release of the spring tensioning permits a pair of support springs to separate the rolls to facilitate the feeding of laminating material through the first pressure station when the machine is being set-up. Releasing the pressure spring tension also may be used to obtain facile adjustment of the spring assembly.

Therefore, a further object of the invention is to provide a novel and improved mechanism for adjusting both the spacing of the two hard rolls and the spring pressure supplied to urge the rolls toward one another.

A related further object of the invention is to provide an overcenter lever mechanism for selective releasing or applying a spring pressure to the hard rolls.

Still another object of the invention is to provide a novel and improved method for laminating a protective sheet to a paper or other base.

A similar object of the invention is to provide a novel and improved method for laminating a protective covering to a paper base with one or more objects interposing between the protective lamina and the paper.

Other objects and a fuller understanding of the invention may be had by referring to the following description and claims taken in conjunction with the accompanying drawings in which:

FIGURE 2 is a side elevational view of the novel and improved laminating press with portions of the machine support and work material support arrangements broken away and removed;

Figure 1:
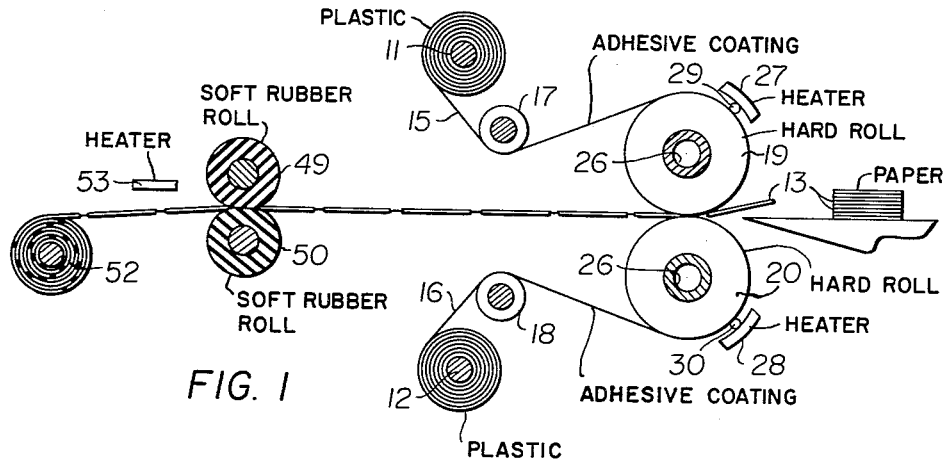
FIGURE 1 is a somewhat schematic view of the device showing the various elements and the process of lamination.
Figure 6:
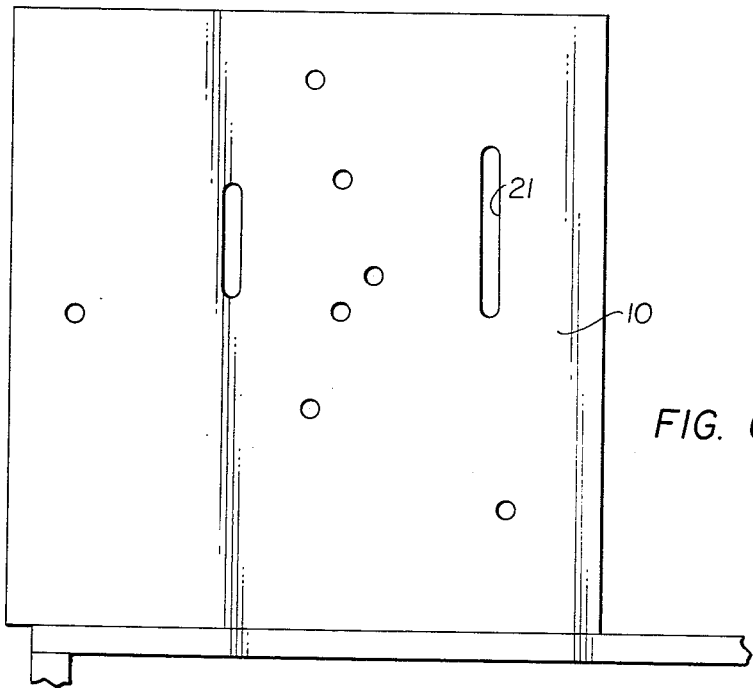
Figure 3:
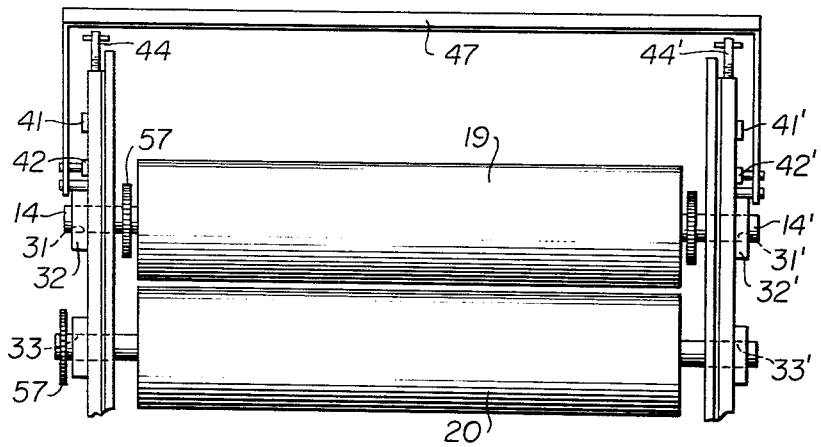
FIGURE 3 is a cross sectional view of the device as seen from the plane indicated by the line 3—3 of FIGURE 2, showing the lever mechanism for selectively applying spring pressure to the hard rolls.
Figure 4:
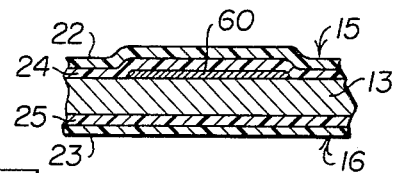
Figure 5:
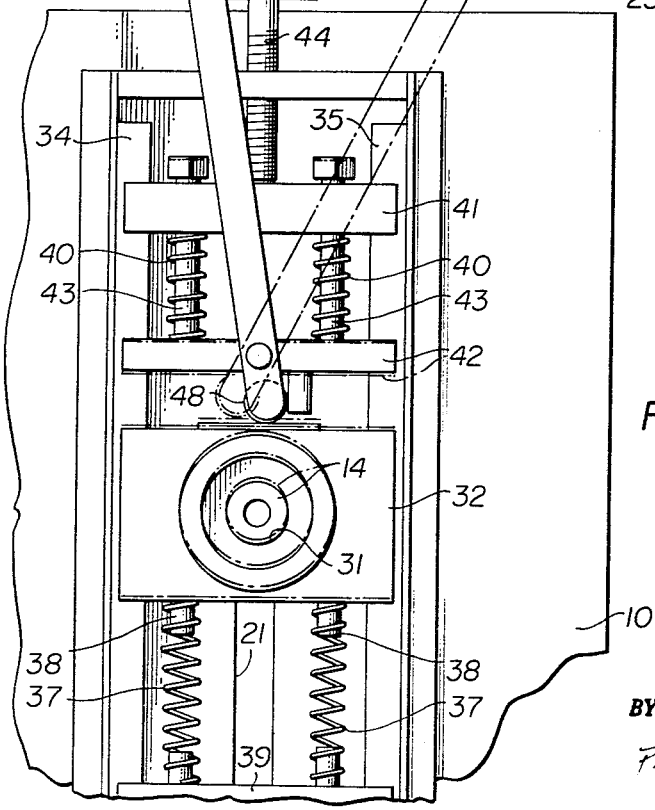

FIGURE 4 is a foreshortened sectional view taken in a plane passing through an object mounted on a laminated substrate on a greatly expanded and exaggerated scale showing, in cross section, one of the products made in accordance with the teachings of this invention; and FIGURE 5 is an enlarged fragmentary side elevational view of the mechanism for supporting the upper hard roll; and FIGURE 6 is a side elevational view of the frame, on a reduced scale.

Referring now to the drawings, a machine frame is shown generally at 10. The frame supports a pair of supply rolls 11 and 12. Each of the supply rolls, 11 and 12, carries a coil of an elongated sheet of plastic material for use in laminating. The sheets of plastic are used to provide the protective and laminating coating to sheets 13, FIGURES 1 to 4, or the like.

The coils of material carried by the rolls 11 and 12 are laminae which are fed out in strips designated by the numerals 15 and 16. The strips 15 and 16 are reeved over suitable tensioning rolls 17 and 18. The strips 15, 16 are led from the tensioning rolls 17 and 18 to a pair of hard rolls 19 and 20.

The laminae are usually applied to both surfaces of the sheet of paper 13 to provide a protective film or coating. The details of the finished laminated product are shown on an exaggerated scale in FIGURE 4. This protective sheet has upper and lower outer protective films 22, 23 of a suitable clear protective material such as the previously mentioned polyester film. The films 22, 23 are bonded to the paper 13 by a suitable adhesive such as the previously mentioned polyethylene. The upper and lower layers of adhesive are designated by their numerals 24 and 25.

The upper strip 15 is composed of the outer film 22 and the adhesive layer 24. The lower strip 16 is composed of the outer film 23 and the adhesive layer 25. The details of the method of applying these laminae to the paper 13 will be described in greater detail below.

Since the adhesive layers 24, 25 are preferably heat softenable adhesives, suitable heat sources must be provided. Where the mentioned polyester film is utilized for protection, the hard rolls 19, 20 may be heated and the heat can pass through the outer film. However, it is often desirable to use outer films which do not have the heat resistance of a polyester film. This is accomplished by providing shoe type heaters which heat only the adhesive and not the outer film. Further, it has been discovered that exceptional bond characteristics can be obtained if only te bonding surface of the adhesive is softened. To accomplish this bonding surface softening, shoe type heaters 27 and 28 are provided.

The heaters 27, 28 are arcuately curved and in closely spaced relationship with the hard rolls 19, 20 respectively. Thermocouples 29, 30 may be interposed between the heater 27 and the roll 19, and between the heater 28 and the roll 20 respectively. The temperature to which the adhesive layer is exposed is then controlled by these thermocouples through suitable and usual heat control means, not shown.

One of the outstanding advantages of this device is that a very wide variety of laminating materials may be used with highly satisfactory results. The use of spaced shoe type heaters contributes very materially to this versatility because it permits low or high cost films to be used. To further facilitate the use of low cost coatings, one or both of the hard rolls may be chilled through the use of suitable cooling passages 26 or the like. Where it is desired to heat the rolls 19, 20 the passages 26 may be use as heating passages. Thus the adhesive may be softened by heat from either the shoe heaters or the rolls or both.

With the hard rolls of the preferred and disclosed arrangement one roll is made of a composition such as hard rubber, and the other is steel.

The hard rolls are held in closely spaced yet yieldable relationship. To accomplish this close but yieldable relationship, the upper roll 19 has a shaft 14 which projects through an elongated slot 21 formed in the frame 10, FIGURE 6. The upper roll 19 is journaled at locations at each of its ends designated by the numerals 31 and 31', in a spaced pair of movable journal or bearing blocks 32 and 32'. The ends of the lower roll 20 are journaled in the frame at locations designated by the numerals 33 and 33'. Thus, in the preferred and disclosed arrangement, only the upper roll 19 is movable relative to the frame to provide relative adjustment between the rolls 19 and 20.

For clarity of illustration, only the support of the end of the rolls which appears in FIGURES 2 and 5 will be described. It will be recognized that the support at the opposite end is the mirror image of the described support. However, for clarity, only the one end will be described, while the mirror image part will be identified by the corresponding number with a prime added.

The bearing block 32 is positioned between a pair of guide tracks 34, 35. The guide tracks 34, 35 maintain the bearing block 32 in selected positions along a vertically disposed, rectilinear path. This path is along a plane defined by the axis of the hard rolls 19, 20, and passing through a first pressure applying station defined by the hard rolls. A pair of support springs 37 are positioned around guide bars 38 and between the bearing block 32 and a lower support 39. The support springs 37 apply upward pressure to hold the upper roll 19 in a selected and adjusted position against the action of tension springs 40 when the rolls are adjusted in spaced relationship.

The tensioning springs 40 are positioned between upper and lower tensioning spring supports 41 and 42. The tensioning springs 40 are held in position by suitable tensioning spring guides 43. The tensioning spring supports 41 and 42 are formed to coact with the guide tracks 34 and 35. The tensioning springs 40, along with their supports 41 and 42, form a tensioning spring assembly which is adjustable up and down the guide tracks 34 and 35. A micrometer adjustment screw 44 is provided to thread the tensioning spring assembly up and down in this adjustment movement.

A tension applying lever 47 is pivotally mounted on the lower tensioning support 42. The tensioning lever 47 has a roller 48 at its lower end which coacts with the bearing block 32 to urge the block downwardly when the lever 47 is pivoted from the position shown in FIGURE 2 and in phantom lines in FIGURE 5 over center to the position shown in solid in FIGURE 5. When the tensioning lever 47 is in its over center position, micrometer adjustment of the screw 44 will adjust the upper roll 19 up and down. Rotation of the micrometer adjustment 44 also varies the pressure of the tensioning springs 40 and the support springs 37, since these springs oppose one another. The downward adjustment may be continued until the rolls are in contact with one another. Once the hard rolls 19 and 20 are brought into engagement with one another, further rotation of the micrometer screws 44 and 44', urging the tensioning assembly downwardly, will increase the tensioning pressure of the tnsioning springs 40 at a very rapid rate.

Shifting of the lever 47 over center to the release position shown in phantom in FIGURE 5 substantially removes the pressure of the tensioning springs 40 from the bearing block 32. With the tensioning spring pressure removed, the support springs 37 will elevate the upper roll 19. This facilitates feeding material between the rolls and clearing any jams which may occur. It also facilitates the tensioning adjustment, since pressure is taken off the tensioning springs.

As previously indicated, the hard rolls 19 and 20 define a first pressure applying station. A second work station, spaced from the first, is defined by a pair of soft rubber rolls 49 and 50. The soft rubber rolls 49 and 50 are held in closed relationship and preferably in abutment with one another.

A pickup reel 52 is provided. The pickup reel 52 may, as is more fully described below, be utilized to coil the finished product. A reheating element 53 is positioned between the second work station of the soft rubber rolls 49 and 50 and the pickup reel 52. The use of the reheating element 53 will also be described in greater detail in conjunction with the method of operation.

A drive motor 55 is mounted on the frame 10. A plurality of chains 56 are reeved over suitable sprockets 57 to provide synchronized drive of the hard rolls 19 and 20, the soft rolls 49 and 50, the tensioning rolls 17 and 18, and the pickup reel 52.

*Method of Laminating*

The method will first be described in terms of applying a protective laminating sheet or coating to only the upper surface of the paper 13 or other material to be protected. If a lamina is to be applied only to the upper surface of the paper 13, the lower lamina 16 is neither fed around the hard roll 20 nor through the first pressure station.

In applying a lamina to the upper surface of the paper 13, the upper strip 15 is fed from the coil 11, around the tensioning roll 17, and over the hard roll 19 with the outer film 22 against the surface of the roll 19. This feeding is accomplished by first moving the lever 47 to its release position. This allows the support springs 37 to elevate the upper roll 19. The lamina is then fed over the indicated rolls and, of course, under the heater 27 and the upper thermocouple 29. The lamina 15 is then fed through the first pressure station, defined by the hard rolls 19 and 20, and thence through the second pressure station defined by the soft rolls 49 and 50. When the lamina is to be applied to only the upper surface of a substrate, the strip 15 may then be fed onto the pickup roll 52.

Once the strip 15 has been fed as described, the heater 27 is turned on, the lever 47 is shifted to its over-center position, and the laminating operation may commence. The motor 55 is placed in operative driving engagement with the various connected rolls. The strips of paper 13 are then fed one at a time into the first work station to travel with the strip 15. As the strip and paper pass through the first work station between the hard rolls 19 and 20 with the upper adhesive layer 24 in a heat softened condition, a bond is formed between the strip and the paper. Subsequently, the strip and bonded paper pass together between the soft rubber rolls 49 and 50.

The soft rubber rolls are sufficiently close together and sufficiently rigid to apply squeezing pressure to the lamination. At the same time, they have sufficient resiliency to readily deform to the shape of the object passing between them. Thus, the rolls 49 and 50 forming the second pressure applying station, tend to "knead" the lamina to provide a firm, uniform finish bond, as well as the more obvious function of drawing the lamina from the first pressure station. Thus, it is important that the heat softenable adhesive still be in a somewhat softened condition as the lamina passes through the second work station in order that this kneading will in fact result in a firm, uniform bond. Further, as a continuous operation is performed, a unique result is obtained. The hot lamina causes a heat build up in the soft rolls which assists in the obtainment of a good, uniform product by assuring warming in the second station.

Where a protective lamina is applied to only one surface of the paper, there is a tendency for the paper to assume a reverse bend. The laminated surface tends to become a concave surface. To overcome this problem and to provide a convenient storage, if desired, the finished product may be wound onto the pickup roll 52. When so wound, the winding is accomplished with plastic protective coating to the outside. The heaters 53 are provided to resoften the adhesive if the pickup roll is being used to prevent a warped finished product. The film and adhesive both have insulating properties so the coiled material remains warm for protracted periods to assist in obtaining a flat finished product.

When it is desired to laminate both sides of the paper 13, the method is identical to the previously described method with the obvious exception that the lower strip 16 is fed through the work stations before the laminating operation is commenced. Additionally, the heater 53 is not used because warpage of a finished product laminated on both sides is not a problem. For the same reason, the pickup roll 52 is usually not used when a protective lamina is applied to both sides of the paper 13.

An object, or objects, 60 may be interposed between the paper 13 and the upper film 22. The objects 60, of course, may be between the paper and the lower film 23; however, the preferred arrangement is between the paper and the upper lamina for reasons that will become apparent. If it is desired to place such objects 60, such as flakes of metal, between the paper and the lamina, the objects are simply placed on top of the paper 13 before it is fed into the first pressure applying station. Similarly, such things as sample fingernail or paint chips or butterflies may be fixed in a desired location on the paper 13 before the paper is fed through the first work station.

One of the outstanding advantages of this invention is that it is possible to laminate thin, substantially non-compressible, protective, plastic coverings to thin, non-compressible substrates, while objects are interposed between the substrate and the coverings. This is true, even though the substrate and protective coating are extremely thin and do not deform to provide a smooth, flat finished sheet with the objects imbedded in them, but rather deform somewhat if the object is bulky. Paper and materials which are paper like in the context of this invention, such as aluminum foil and thin wood sheets, are all suitable as substrates because the machine will force thin protective films into bonded engagement with them.

It is believed that the explanation for this phenomenal result with paper and the like resides in the combination of first compressing the covering and the paper, with the object therebetween, between the pair of hard, yet yieldably mounted rolls. This forms a very satisfactory bond between the lamina and the paper, but at the same time it may leave a space between the covering and the paper around the object. This is especially true if relatively thick objects are interposed between the covering and the paper. Any such spaces completely disappear, however, as the laminated product is fed through the second work station.

It is believed that the soft rubber rolls deform to apply pressure in close circumscribing relationship around each of the objects as well as over the objects. Thus, pressure is applied over the entire surface area even though that surface is irregular. The finished bond is uniform and free of imperfections with the protective lamina in very close circumscribing relationship with the objects interposed between the lamina and the paper.

While the invention has been described with a great deal of detail, it is believed that it essentially comprises a laminating press having a pair of hard yieldably mounted, cylindrically contoured rolls and a pair of soft cylindrically contoured rolls spaced from the hard rolls. The press had a heat application station and two spaced pressure applying stations, one of which may be interchangeably used as a supplemental heating station and a cooling station, defined by the pairs of rolls. The mechanism also includes means to drive the rolls in synchronism and draw a lamina and sheet of material to be protected through the pressure applying stations. The invention also includes a novel and improved method of lamination.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A laminating press comprising a frame, a first pair of rolls comprising first and second hard surfaced cylindrically contoured rolls, the first pair of rolls being journalled on the frame and mounted in closely spaced relationship to define a first pressure applying station therebetween, tensioning springs connected to the frame and operably connected to one of the hard rolls to bias and one hard roll toward the other hard roll, support springs connected to the frame and operably connected to said one hard roll and biasing said one hard roll away from the other hard roll against the action of the tensioning springs, the first roll being a metal roll and the second roll being a firm rubber composition roll, first and second shoe type heating elements mounted on the frame, said first heating element being disposed adjacent said first roll and extending longitudinally from substantially one end of the first roll to the other, said second heating element being disposed adjacent said second roll and extending from substantially one end of the second roll to the other, said first and second heating elements being respectively spaced from said first and second rolls to heat the outer surface of one of a pair of laminating sheets reeved over each of said rolls, a pair of relatively soft cylindrically contoured rubber rollers positioned in substantial abutment with one another and journalled on the frame parallel to one another and to the first and second hard rolls, said soft rollers defining a second work station, said pairs of rolls being positioned to define a path of travel from one station to the other for sheets of material to be laminated together with one roll of each pair on each side of the path and drive means connected to said first and second rolls and to said pair of soft rollers to tension such pair of laminating sheets and to draw said laminating sheets past the said heaters and then draw said laminating sheets, and an included sheet of material to be covered, through said first and second pressure applying stations respectively.

2. The device of claim 1 wherein a first thermocouple is between the first heating element and the adjacent hard roll and a second thermocouple is between the second heating element and the adjacent roll and wherein the first thermocouple is connected to the first heating element and the second thermocouple is connected to the second heating element to control the temperature of the heating elements.

3. The device of claim 1, wherein each of said hard rolls includes a passage to receive fluid to vary the temperature of the roll fro mthe ambient temperature.

4. The device of claim 1 and wherein the first roll includes an internal cooling passage for receiving chilling fluid to chill said first roll.

5. In a laminating press having first and second parallel hard surfaced rolls carried by a frame and defining a pressure applying station, the improvement which comprises a pair of spaced bearing blocks, means movably mounting the blocks on opposite ends of said station, said first roll being journaled in said blocks and adjustable toward and away from the second roll in a plane defined by the axes of said rolls and passing through said pressure station, supporting spring means interposed between the frame and said blocks and urging said first roll away from said second roll, tensioning spring means connected to the frame and operatively connected with said first roll to urge the first roll toward the second against the action of the supporting spring means, and adjustment means connected to the frame and operably connected to the first roll to selectively position the first roll relative to the second and to adjustably compress said tensioning spring means.

6. A laminating press comprising:
(a) a frame;
(b) a first pair of closely spaced, parallel mounted, cylindrically contoured, hard surfaced, rolls journaled on the frame and defining a first pressure applying station;
(c) tensioning spring interposed between at least one of the rolls of the first pair and the frame and yieldably biasing said one roll toward the other support springs connected to the frame and operably connected to said one hard roll, and biasing said one hard roll away from said other roll against the action of the tensioning springs;
(d) a second pair of closely spaced, parallel mounted, relatively soft rubber, cylindrically contoured, rolls journaled on the frame and defining a second pressure applying station;
(e) said pairs of rolls being parallel with one another and positioned to define a path of travel from one station to the other for sheets of material to be laminated together with one roll of each pair on each side of the path;
(f) a heating element associated with the pair of hard rolls and providing a heat station to soften an adhesive forming a part of a sheet of material;
(g) the rolls of one pair being sufficiently close to the other pair that the sheets travel from the first to the second pressure station while the adhesive is in a heat softened state; and,
(h) drive means connected to the said rolls to rotate the rolls in synchronism and draw such sheets through such heat station and draw the sheets through the first and second pressure applying stations successively.

7. In the press of claim 6:
(a) a take up roll journalled on the frame parallel to the rolls of said pairs, said take up roll and said second pair of rolls locating a second path, said take up roll being positioned to receive and coil a laminated sheet delivered along the second path from the second pair of rolls; and
(b) a reheating element along and to one side of said second path and near said take up roll to reheat a lamina of said laminated sheet prior to coiling.

8. A laminating press comprising:
(a) a frame;
(b) a first pair of parallel mounted cylindrically contoured hard surfaced rolls journaled on the frame and defining a first pressure applying station;
(c) tensioning springs interposed between one of the hard rolls of the first pair and the frame and yieldably biasing said one hard roll toward the other hard roll, support springs interposed between the frame and said one hard roll and biasing said one hard roll away from said other roll against the action of said tensioning springs;
(d) spacing adjustment means operably connected to the springs for adjusting the tension of the springs and thereby adjust the spacing between the hard rolls;
(e) the hard rolls being closely spaced to apply pressure to a sheet of material and at least one sheet of protective lamina fed through said first pressure applying station;
(f) a pair of parallel mounted cylindrically contoured soft rubber rolls journaled on the frame and substantially in abutment with one another to define a second pressure applying station;
(g) a heating element connected to the frame and associated with the pair of hard rolls and providing a heat station to soften an adhesive forming a part of said lamina;
(h) said pairs of rolls defining a path of material travel from one station to the other with one roll of each pair on one side of the path and another roll of each pair on the other side of the path;
(i) said pairs of rolls being parallel to one another and sufficiently close that the sheets travel from the first to the second pressure station while the adhesive is in a heat softened state; and,
(j) drive means connected to the said rolls to rotate the rolls in synchronism and draw such lamina through such heat station and draw the lamina and the sheet of material through the first and second pressure applying stations successively.

9. In a laminating press having first and second hard surfaced rolls carried by a frame and defining a pressure applying station, the improvement which comprises, first and second spaced bearing block members, means movably mounting the blocks on opposite ends of said station, said first roll being journaled in said blocks and adjustable in a plane defined by the axis of said rolls and passing through said station, supporting spring means interposed between the frame and said blocks and urging said first roll away from said second roll, first and second tensioning springs connected to the frame and paired respectively with the first and second block members, said tensioning springs being operatively connected to said first roll to urge the first roll toward the second against the action of the supporting spring means, adjustment means operably connected to the frame and the first roll to selectively position the first roll relative to the second and to adjustably compress said tensioning spring members first and second tensioning spring support members between the first and second tensioning springs and the first and second block members respectively, over-center lever means pivotably mounted on one of the first members and on one of the second members, said levers each being pivotable from a spring release to a spring tensioning position, and each of said levers being in operative engagement with the other of the like numbered members of its pair when in the spring tensioning position.

10. In a laminating machine including a frame the improvement which comprises:
(a) a first roll journaled on the frame;
(b) a second roll slideably mounted on the frame parallel to the first roll and movable along a path from a position substantially abutting the first roll to a position spaced from the first roll;
(c) supporting spring means operably connected to the rolls urging the second roll away from the first roll along said path; and,
(d) tensioning spring means connected to the frame and operably connected to the second roll for urging the second roll toward the first roll along said path and against the action of the supporting spring means.

11. The device of claim 10 wherein a lever means is operatively connected to the tensioning spring means for selectively applying the pressure of the tensioning spring means to the supporting spring means.

References Cited in the file of this patent
UNITED STATES PATENTS
167,233    Field _____ Aug. 31, 1875
(Other references on following page)

UNITED STATES PATENTS

| | | |
|---|---|---|
| 1,167,036 | Witham et al. | Jan. 4, 1916 |
| 1,311,491 | Briggs | July 29, 1919 |
| 2,171,259 | Scott | Aug. 29, 1939 |
| 2,447,258 | Lobley | Aug. 11, 1948 |
| 2,607,712 | Sturken | Aug. 19, 1952 |
| 2,788,838 | Crabbe et al. | Apr. 16, 1957 |
| 2,818,904 | Ambrose | Jan. 7, 1958 |
| 2,828,237 | Rosser | Mar. 25, 1958 |
| 2,977,271 | Lutwack | Mar. 28, 1961 |
| 3,071,066 | Bodi et al. | Jan. 1, 1963 |